United States Patent
Tom et al.

(10) Patent No.: US 6,660,063 B2
(45) Date of Patent: Dec. 9, 2003

(54) SORBENT-BASED GAS STORAGE AND DELIVERY SYSTEM

(75) Inventors: Glenn M. Tom, New Milford, CT (US); James V. McManus, Dansbury, CT (US); Luping Wang, Brookfield, CT (US); W. Karl Olander, Indian Shores, FL (US)

(73) Assignee: Advanced Technology Materials, Inc, Danbury, CT (US)

( * ) Notice: Subject to any disclaimer, the term of this patent is extended or adjusted under 35 U.S.C. 154(b) by 3 days.

(21) Appl. No.: 10/147,145

(22) Filed: May 16, 2002

(65) Prior Publication Data

US 2003/0033930 A1 Feb. 20, 2003

Related U.S. Application Data

(63) Continuation-in-part of application No. 09/564,323, filed on May 3, 2000, now Pat. No. 6,406,519, which is a continuation-in-part of application No. 09/082,596, filed on May 21, 1998, now Pat. No. 6,132,492, which is a continuation-in-part of application No. 08/809,019, filed as application No. PCT/US95/13040 on Oct. 13, 1995, now Pat. No. 5,935,305, application No. 10/147,145, which is a continuation-in-part of application No. 09/874,084, filed on Jun. 5, 2001, now Pat. No. 6,561,213, which is a continuation-in-part of application No. 09/624,478, filed on Jul. 24, 2000, now Pat. No. 6,453,924, application No. 10/147,145, which is a continuation-in-part of application No. 09/624,478.

(51) Int. Cl.$^7$ ................................................ B01D 53/04
(52) U.S. Cl. .................................. 95/90; 95/95; 95/106; 95/133; 96/108; 96/130; 96/143; 96/147; 206/0.7
(58) Field of Search ............................... 95/95, 96, 103, 95/106, 114, 115, 127, 131–133, 148, 901–903; 96/108, 121, 122, 126–128, 130–132, 143, 144, 146, 147; 206/0.7

(56) References Cited

U.S. PATENT DOCUMENTS

| | | | |
|---|---|---|---|
| 240,423 A | 4/1881 | James ....................... | 206/0.7 X |
| 1,608,155 A | 11/1926 | Barnebey ................. | 206/0.7 X |
| 1,714,245 A | 5/1929 | Schaefer ................... | 96/146 X |
| 2,356,334 A | 8/1944 | Maude et al. ............ | 206/0.7 X |
| 2,450,289 A | 9/1948 | Marek ....................... | 96/146 X |
| 2,663,626 A | 12/1953 | Spangler .................. | 206/0.7 X |

(List continued on next page.)

FOREIGN PATENT DOCUMENTS

| | | | |
|---|---|---|---|
| DE | 1095796 | 12/1960 | ................ 95/133 |
| DE | 2264512 | 1/1974 | ................ 95/133 |
| DE | 3139781 | 4/1983 | ................ 96/122 |
| JP | 52-072373 | 6/1977 | ................ 96/130 |
| JP | 56-158087 | 12/1981 | |
| JP | 56-158126 | 12/1981 | ................ 96/130 |
| JP | 61-133116 | 6/1986 | ................ 96/121 |
| JP | 63-088017 | 4/1988 | ................ 96/121 |
| JP | 03-127606 | 5/1991 | ................ 96/108 |
| RU | 1181692 | 9/1985 | ................ 95/133 |
| RU | 1544475 A1 | 2/1990 | ................ 95/133 |
| RU | 1583151 A1 | 8/1990 | ................ 95/133 |

OTHER PUBLICATIONS

"Beaded Carbon UPS Solvent Recovery", Chemical Engineering, vol. 84 No. 18, pp. 39–40, Aug. 29, 1977.

*Primary Examiner*—Robert H. Spitzer
(74) *Attorney, Agent, or Firm*—William Ryann; Steven J. Hultquist; Margaret Chappuis (57) ABSTRACT

A capacity increase and/or pressure decrease of gas in a gas storage and dispensing vessel is achieved by use of a physical adsorbent having sorptive affinity for the gas. Such approach enables conventional high pressure gas cylinders to be redeployed with contained sorbent, to achieve substantial enhancement of safety and capacity.

36 Claims, 3 Drawing Sheets

U.S. PATENT DOCUMENTS

| | | | | |
|---|---|---|---|---|
| 2,987,139 A | 6/1961 | Bush | | 95/133 |
| 2,997,371 A | 8/1961 | Wadsworth et al. | | 95/131 X |
| 3,006,153 A | 10/1961 | Cook | | 206/0.7 X |
| 3,080,307 A | 3/1963 | Rinald | | 96/127 X |
| 3,093,564 A | 6/1963 | Weisman et al. | | 96/127 X |
| 3,116,132 A | 12/1963 | Haller et al. | | 95/132 X |
| 3,144,200 A | 8/1964 | Taylor et al. | | 96/108 X |
| 3,264,803 A | 8/1966 | Read | | 96/146 X |
| 3,287,432 A | 11/1966 | Sensel | | 95/95 |
| 3,415,069 A | 12/1968 | Hauser | | 96/126 X |
| 3,469,375 A | 9/1969 | Barrington et al. | | 96/146 X |
| 3,675,392 A | 7/1972 | Reighter | | 95/96 |
| 3,713,273 A | 1/1973 | Coffee | | 96/128 X |
| 3,719,026 A | 3/1973 | Sand | | 95/106 |
| 3,788,036 A | 1/1974 | Lee et al. | | 96/130 X |
| 4,023,701 A | 5/1977 | Dockery | | 206/0.7 X |
| 4,263,018 A | 4/1981 | McCombs et al. | | 96/130 X |
| 4,343,770 A | 8/1982 | Simons | | 206/0.7 X |
| 4,378,982 A | 4/1983 | McCombs | | 96/130 X |
| 4,414,005 A | 11/1983 | De Bievre et al. | | 95/127 |
| 4,495,900 A | * 1/1985 | Stockmeyer | | 123/1 A |
| 4,578,256 A | 3/1986 | Nishino et al. | | 95/133 X |
| 4,723,967 A | 2/1988 | Tom | | 96/108 X |
| 4,738,693 A | 4/1988 | Tom | | 96/108 X |
| 4,738,694 A | 4/1988 | Godino et al. | | 96/126 X |
| 4,744,221 A | 5/1988 | Knollmueller | | |
| 4,749,384 A | 6/1988 | Nowobilski et al. | | 96/108 X |
| 4,830,643 A | 5/1989 | Sassa et al. | | 96/108 |
| 4,881,958 A | 11/1989 | Eckardt et al. | | 96/127 |
| 5,051,117 A | 9/1991 | Prigge et al. | | 95/95 |
| 5,089,244 A | 2/1992 | Parent et al. | | 95/133 X |
| 5,112,367 A | 5/1992 | Hill | | |
| 5,133,787 A | 7/1992 | Diot et al. | | 96/121 |
| 5,151,395 A | 9/1992 | Tom | | 502/67 |
| 5,202,096 A | 4/1993 | Jain | | 96/126 X |
| 5,213,769 A | 5/1993 | Whitlock | | |
| 5,238,469 A | 8/1993 | Briesacher et al. | | 96/126 X |
| 5,409,526 A | 4/1995 | Zheng et al. | | 96/132 |
| 5,417,742 A | 5/1995 | Tamhankar et al. | | 95/96 |
| 5,429,662 A | 7/1995 | Fillet | | |
| 5,512,087 A | 4/1996 | Varner et al. | | |
| 5,518,528 A | 5/1996 | Tom et al. | | |
| 5,704,965 A | 1/1998 | Tom et al. | | |
| 5,704,967 A | 1/1998 | Tom et al. | | |
| 5,707,424 A | 1/1998 | Tom et al. | | |
| 5,800,596 A | 9/1998 | Collin et al. | | 96/108 X |
| 5,917,140 A | 6/1999 | Tom | | |
| 5,935,305 A | 8/1999 | Tom et al. | | |
| 6,089,027 A | 7/2000 | Wang et al. | | |
| 6,101,816 A | 8/2000 | Wang et al. | | |
| 6,132,492 A | 10/2000 | Hulquist et al. | | 95/45 |
| 6,155,289 A | 12/2000 | Carlsen et al. | | |
| 6,406,519 B1 | 6/2002 | Tom et al. | | |

\* cited by examiner

SORBENT-BASED GAS STORAGE AND DELIVERY SYSTEM

CROSS-REFERENCE TO RELATED APPLICATIONS

This is a continuation-in-part of U.S. patent application Ser. No. 09/564,323 filed May 3, 2000, issued Jun. 18, 2002 as U.S. Pat. No. 6,406,519, which is a continuation-in-part of U.S. patent application Ser. No. 09/082,596 filed May 21, 1998, issued Oct. 17, 2000 as U.S. Pat. No. 6,132,492, which is a continuation-in-part of U.S. patent application Ser. No. 08/809,019 filed Mar. 27, 1998 under 35 USC 371 and issued Aug. 10, 1999 as U.S. Pat. No. 5,935,305, based on International Patent Application PCT/US95/13040 filed Oct. 13, 1995, claiming the priority of U.S. patent application Ser. No. 08/322,224 filed Oct. 13, 1994 and issued May 21, 1996 as U.S. Pat. No. 5,518,528. This is also a continuation-in-part of U.S. patent application Ser. No. 09/624,478 filed Jul. 24, 2000, issued Sep. 24, 2002 as U.S. Pat. No. 6,453,924. This is further a continuation-in-art of U.S. patent application Ser. No. 09/874,084 filed Jun. 5, 2001, now U.S. Pat. No. 6,561,213, which is a continuation-in-part of U.S. patent application Ser. No. 09/624,478 filed Jul. 24, 2000, issued Sep. 24, 2002 as U.S. Pat. No. 6,453,924.

BACKGROUND OF THE INVENTION

1. Field of the Invention

This invention relates generally to storage and dispensing systems for the selective dispensing of gaseous reagents from a vessel in which the gas component(s) are held in sorptive relationship to a solid adsorbent medium, and are desorptively released from the sorbent medium in the dispensing operation.

2. Description of the Related Art

In the manufacture of semiconductor materials and devices, and in various other industrial processes and applications, there is a need for a reliable source of hydride and halide gases, as well as a wide variety of other process gases. Many such gases, including for example silane, germane, ammonia, phosphine, arsine, diborane, stibine, hydrogen sulfide, hydrogen selenide, hydrogen telluride, and corresponding and other halide (chlorine, bromine, iodine, and fluorine) compounds, as a result of toxicity and safety considerations, must be carefully stored and handled in the industrial process facility.

The gaseous hydrides arsine ($AsH_3$) and phosphine ($PH_3$) are commonly used as sources of arsenic (As) and phosphorous (P) in ion implantation. Due to their extreme toxicity and high vapor pressure, their use, transportation and storage raise significant safety concerns for the semiconductor industry. Ion implantation systems typically use dilute mixtures of $AsH_3$ and $PH_3$ at pressures as high as 1500 psig. A catastrophic release of gas from these high-pressure cylinders could pose a serious injury potential and even death to fab workers.

Based on these considerations, the ion implant user must choose between solid or gas sources for arsenic and phosphorous species. Switching from As to P on an implanter with solid sources can take as long as 90 minutes. The same species change requires only 15 minutes with gas sources. However, arsine ($AsH_3$) and phosphine ($PH_3$), the two most commonly used source gases, are highly toxic. Their use has recently been the focus of widespread attention due to the safety aspects of handling and processing these gases. Many ion implantation systems utilize hydride gas sources supplied as dilute mixtures (10–15%), in either 0.44 L or 2.3 L cylinders at pressures of 400–1800 psig. It is the concern over the pressure-driven release of the gases from cylinders that has prompted users to investigate safer alternatives.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

Despite the disadvantages of gaseous reagents at high pressures, high-pressure cylinder packaging continues to be pervasively used in the semiconductor manufacturing industry, for storage and delivery of a wide variety of semiconductor process gases. For example, boron trifluoride and silane are conventionally delivered to the semiconductor manufacturing facility and high-pressure gas cylinders. The gas storage capacity of the cylinders is usually determined and limited by the interior pressure of the gas cylinder. It therefore is advantageous, in increasing the storage capacity of the fixed-volume gas cylinders conventionally used in the industry, to increase cylinder pressures substantially. Unfortunately, however, this expedient increases the accompanying risks and hazards of leakage or catastrophic cylinder failure. Nonetheless, the pressurized gas cylinders conventionally employed in the industry have been in use for many years and are present in the market in very large numbers. Further, such pressurized gas cylinders must be approved for conventional transport by the U.S. Department of Transportation, and the appertaining DOT regulations are highly specific and widely accepted as governing the structure and operational characteristics of the gas package. The conventional high pressure gas cylinder therefore is firmly entrenched in the market, as a DOT-approved gas containment vessel.

Reducing the pressure level of gases in conventional gas cylinders, to enhance their safety, results in diminution of cylinder capacity, with associated reduced efficiency and productivity when such reduced pressure gas cylinders are employed as gas storage and dispensing vessels in a semiconductor manufacturing facility.

Gases in high-pressure gas cylinders as a result of their inherent dangers have an associated set of safety requirements. High-pressure gas cylinders are generally placed 200–250 feet from process tools, typically in dedicated gas rooms, in the semiconductor manufacturing facility. The high pressure level of such gas packaging also implicates the ambient environmental controls that must be practiced when high-pressure gas cylinders are placed in dedicated gas rooms or gas cabinets, since such rooms and cabinets must be ventilated at a rate determined by the pressure of the contained gases, so as to effectively remove any gas leakage from the cylinder into the ambient environment. In other words, a higher pressure gas cylinder will require a higher ventilating gas volumetric flow rate in order to "sweep" the ambient environment of any gas leaking from the cylinder.

As a result of their toxicity and hazards, high-pressure gas cylinders have in various instances been replaced by liquid precursors in atmospheric pressure packages, which minimize release potentials of hazardous or toxic reagents.

The use of high-pressure gas cylinders with their associated elevated pressure levels also entails operational issues, including equipment and flow circuitry service lifetimes and maintenance intervals.

High-pressure gas cylinder usage entails reduction of lifetimes of valves, in comparison to valve operation at substantially lower pressures.

Figure 1:
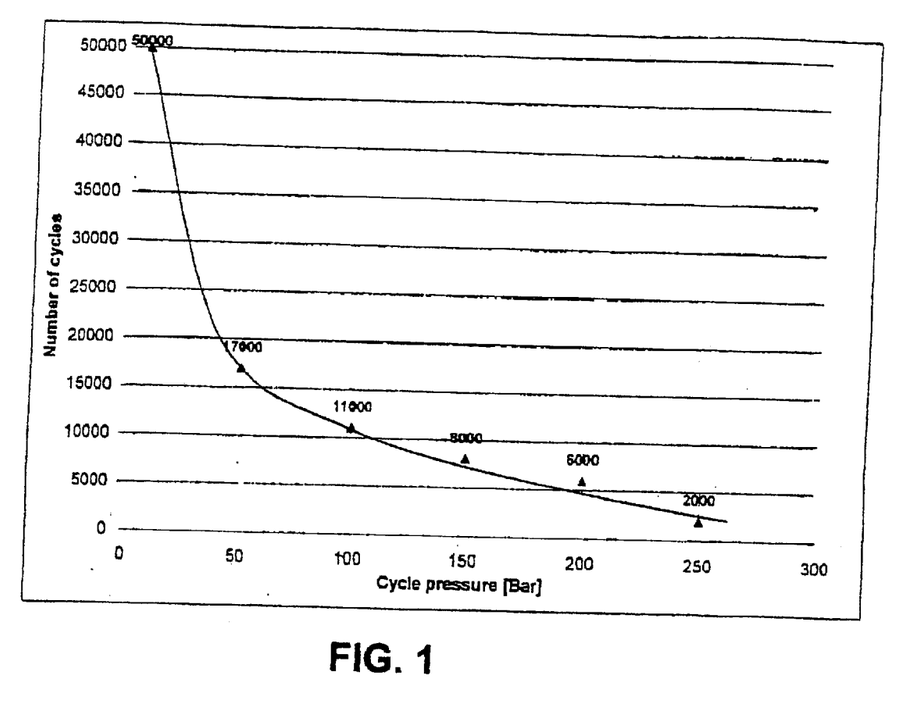
FIG. 1 is a graph of results of valve cycle testing, showing valve lifetime as a function of operating pressure.

FIG. 1 shows the results of valve cycle testing, in the form of valve lifetime as a function of operating pressure, demonstrating this factor. Further, at reduced pressure, connections are easier to make leak-tight, and pressure surges are more readily reduced or eliminated. Valves at lower pressure seal more effectively and are less likely to leak and/or generate particles. Additionally, purge/vent cycles are more effective with less material to remove from process vessels and flow circuitry at lower pressures.

It therefore is apparent from the foregoing discussion that the conventional usage of high-pressure gas cylinders for storage and dispensing of gaseous reagents in semiconductor manufacturing operations, as well as in other industrial processes, has substantial associated disadvantages.

SUMMARY OF THE INVENTION

The present invention relates generally to storage and dispensing systems for the selective dispensing of gaseous reagents from a vessel in which the gas component(s) are held in sorptive relationship to a solid adsorbent medium, and are desorptively released from the sorbent medium in the dispensing operation.

In one specific aspect, the invention relates to a gas storage and dispensing system including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel.

In another aspect, the invention relates to a method of increasing capacity of a high pressure gas cylinder for containing gas at a predetermined pressure level and/or decreasing the pressure of gas in said cylinder while maintaining at least as large an inventory of gas therein, said method comprising disposing in the interior volume of said vessel a physical adsorbent having sufficient sorptive affinity and capacity for said gas, so that the cylinder containing said physical adsorbent holds more gas at a corresponding pressure or has a gas pressure below said predetermined pressure level at a same gas inventory amount.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The disclosures of the following patent applications and patents are hereby incorporated herein by reference in their entireties:

U.S. patent application Ser. No. 09/564,323 filed May 3, 2000, issued Jun. 18, 2002 as U.S. Pat. No. 6,406,519;

U.S. patent application Ser. No. 09/082,596 filed May 21, 1998, issued Oct. 17, 2000 as U.S. Pat. No. 6,132,492;

U.S. Pat. No. 5,935,305 issued Aug. 10, 1999;

U.S. Pat. No. 5,518,528 issued May 16, 1996;

U.S. Pat. No. 5,704,965 issued Jan. 6, 1998;

U.S. Pat. No. 5,704,967 issued Jan. 6, 1998;

U.S. Pat. No. 5,707,424 issued Jan. 13, 1998;

U.S. Pat. No. 5,917,140 issued Jun. 29, 1999;

U.S. Pat. No. 6,101,816 issued Aug. 15, 2000;

U.S. Pat. No. 6,155,289 issued Dec. 5, 2000;

U.S. Pat. No. 6,089,027 issued Jul. 18, 2000;

U.S. patent application Ser. No. 09/552,347 filed Apr. 19, 2000, issued Feb. 5, 2002 as U.S. Pat. No. 6,343,476; and U.S. patent application Ser. No. 09/874,084 filed Jun. 5, 2001, now allowed.

The present invention provides an elevated pressure storage and delivery system apparatus as a source gas supply means for applications involving semiconductor processing, such as etch cleaning of process equipment using halide gases, chemical vapor deposition using gaseous precursor compounds, dopant delivery of dopant gases or precursors for gaseous dopant species, ion implantation of hydride and halide gases, and organometallic Group V compounds, e.g., arsine, phosphine, chlorine, $NF_3$, $BF_3$, $BCl_3$, diborane ($B_2H_6$ and its deuterium analog, $B_2D_6$), HCl, HBr, HF, HI, tungsten hexafluoride, and $(CH_3)_3Sb$.

The gas source system of the invention is comprised of a leak-tight gas vessel, such as a gas cylinder, containing the gas to be dispensed, adsorbed into a sorbent material comprising suitable physical adsorbent material, at a superatmospheric pressure, i.e., a positive gauge pressure.

The present invention provides a gas storage and delivery system in which a sorbent medium is disposed in a gas storage and dispensing vessel, e.g., a gas cylinder of the type used in conventional practice for containment of high pressure gases, wherein the adsorbent is employed to substantially increase the inventory and capacity of the gas supply system. The sorbent comprises a suitable physical adsorbent having sorptive affinity for the gas to be stored in and dispensed from the storage and dispensing vessel.

The use of physical adsorbent in the gas storage and dispensing vessel, as hereafter described in greater detail, effects a marked improvement in gas storage capacity of the gas storage and dispensing vessel, while at the same time enabling pressure levels to be substantially reduced relative to those heretofore utilized for containment of the gas in same type gas storage and dispensing vessels.

Depending on the pressure level in the sorbent-containing vessel, the risks of leaking and release of gas to the ambient environment of the vessel can be substantially reduced, by factors of $10^2$–$10^3$ or more. As a result of the reduction in pressure afforded by the invention, ventilating gas circulation and flow requirements are reduced for gas cabinets and dedicated gas rooms, which in turn reduces wear and increases service life of associated flow circuitry elements such as pumps, compressors, valves, etc. Concomitantly, the increase in gas storage capacity of vessels in accordance with the present invention permit increased operating time before vessel change-out is required. This likewise reduces the impact on flow circuitry and couplings/connectors and the like associated with the vessel, at its juncture to the flow circuitry of the gas-consuming process system. Further, the economic benefits of the invention enable gases in some applications to regain cost-effectiveness against liquid precursor alternatives.

By reducing pressure in the internal volume of the gas storage and dispensing vessel and/or increasing the gas-holding capacity of the vessel, major process improvements are possible.

It will be recognized that the invention enables substantial variation in terms of vessel pressure level versus capacity characteristics. Since increasing vessel pressure increases the amount of gas adsorbed on the sorbent, it becomes possible, and is preferred, to effect a pressure reduction, relative to the high pressure levels previously used for such gas containment vessels, while at the same time increasing the capacity, so that safety and capacity are both significantly increased.

Reducing gas pressure, as evidenced by the valve lifetime data shown in FIG. 1, substantially extends the lifetime performance of valves and regulators that are utilized for delivery of gas from the gas storage and dispensing vessel. At reduced pressures, connections are easier to make leak-tight, pressure surges are reduced or even eliminated, and valves are able to seal more effectively, thereby reducing leakage and particle generation. Further, purge/vent cycles are enhanced in efficiency as a result of reduced material that must be removed during the purging or venting operation.

Componentry of the gas dispensing equipment has improved operating life by reduction of pressure, and the safety of operation is enhanced not only by reduced pressure levels which will result in less dispersion of gas into the ambient environment in the event of a leak, but also increased equipment reliability that will itself minimize such leak or failure events in the gas supply system.

In the practice of the invention, a gas storage and dispensing vessel contains physical adsorbent having sorptive affinity for the gas to be stored and dispensed (i.e., the "working gas"). The pressure in the interior volume of the gas storage and dispensing vessel is maintained at superatmospheric pressure. The physical adsorbent sorptively retains the working gas and additional gas is retained in the interstices of the sorbent bed, when the adsorbent is provided as a bed of divided sorbent particles. The vessel capacity for the working gas thus includes the physically adsorbed gas that is sorptively bound to the adsorbent particles as well as the interstitial gas retained in the voids or interstices of the sorbent bed and in the head space of the vessel (the volume in the vessel overlying the sorbent bed). The pressure of the working gas in the interior volume of the gas storage and dispensing vessel in accordance with the invention is a superatmospheric pressure, >0 psig, preferably being above 10 psig and more preferably above 50 psig, with pressures generally being in a range for semiconductor manufacturing operations of from about 10 psig to about 1500 psig, more preferably in a range from about 20 psig to about 1000 psig, still more preferably in a range from about 50 to about 500 psig, and most preferably in a range from about 50 to about 200 psig.

By way of specific example, nominally positive pressures from about 50 to about 100 psig are usefully employed for a wide variety of semiconductor manufacturing gases. It will be recognized that the utility of the invention includes positive gauge pressures that are in absolute terms relatively high, but less than the pressure utilized in a vessel containing the working gas without any adsorbent material therein (such vessel hereafter being termed a "sorbent-free vessel") providing a same quantity of working gas. Thus, the deployment of a physical adsorbent in the interior volume of the vessel will always permit the same absolute amount of working gas to be contained at a lower vessel pressure, wherein the physical adsorbent (having sorptive affinity for the working gas) has sufficient sorbate loading of the working gas so that the sorbed gas when released volumetrically exceeds the portion of the interior volume that is taken up by the physical adsorbent (on a void-free basis).

The inventory of physically adsorbed gas that can be retained by the sorbent bed in the gas storage and dispensing vessel will of course vary depending on the specific sorbent material and the gas species involved. One of ordinary skill in the art can readily determine, without undue experimentation, a specific sorbent that is usefully employed for sorptive retention of the working gas in the interior volume of the gas storage and dispensing vessel, for a given end use application.

Thus, techniques such as BET isotherms may be performed within the skill of the art to assess a variety of candidate sorbent materials, to determine a sorbent having sufficient sorptive affinity and loading capacity for the desired end use, and such techniques may be utilized in combination with porosimetry assays, to determine the morphological form of the physical adsorbent that is most advantageously employed in the specific end use.

In use, the physically adsorbed gas on the sorbent in the gas storage and dispensing vessel is desorbed at the point of use by any suitable desorption techniques, including pressure differential, thermal differential and/or chemical potential (concentration) differential, to selectively release the physically adsorbed gas from the sorbent for dispensing from the gas storage and dispensing vessel. For this purpose, the gas storage and dispensing vessel may utilize a dispensing assembly coupled with the closed vessel, to open flow control componentry of the dispensing assembly or downstream flow circuitry, to initiate desorption of gas under a pressure differential, to initiate flow to the downstream gas-consuming equipment or locus of use.

A heating jacket, radiative vessel heater, or other thermal energy input means/method may be employed to effect thermal desorption of the gas from the sorbent in the vessel, so that the working gas thereby is released from the sorbent and may be dispensed through the valve head, dispensing assembly, and downstream flow circuitry to the point of consumption of the working gas. Thermal techniques, however, are less preferred than other desorption approaches, as discussed in the Background section hereof.

A carrier gas may be selectively flowed through the interior volume of the vessel, e.g., through the headspace above the sorbent bed in the vessel, to impose a concentration differential serving to induce mass transfer by desorption of the physically adsorbed gas into the carrier gas, for entrainment therein and dispensing from the vessel in the discharged carrier gas stream. Such use of carrier gas may be advantageous, when dilute quantities of the working gas is required, e.g., for doping, ion implantation or the like, as well as operations such as chemical vapor deposition wherein the working gas is an organometallic reagent, and the carrier gas is required for process control or efficacy, or other operational reasons.

It will be appreciated that any of the aforementioned modes of effecting desorption of the physically adsorbed gas from the sorbent in the interior volume of the vessel may be employed, in permutations and combinations thereof, as well as additional or alternative use of other modalities of effecting desorption, such as those involving an input of ultrasonic, microwave or other energy to the sorbate-containing sorbent material.

The invention therefore affords a method of improving the safety and efficiency of a gas storage and dispensing vessel employed for holding a specific working gas, by the deployment in the interior volume of the vessel of a quantity of physical adsorbent medium at a pressure that is below the pressure at which gas is stored in the corresponding sorbent-free vessel and with a working gas inventory (quantity) in the vessel that is greater than that of the corresponding sorbent-free vessel.

The storage and dispensing vessel utilized in the practice of the present invention may be of any suitable type, including conventional high-pressure cylinder vessels, whose thickness and over-design for containment of gas at high pressure further increases the safety of operation with a sorbent sorptively retaining the working gas at lower pressure. The gas storage and dispensing vessel may be equipped with a valve head assembly including fill and discharge ports, over-pressure relief means such as a pop valve, burst disk, or other over pressure relief means, fluid regulators and flow control elements such as valves of manual or automatic character, couplings for connection to flow circuitry or other dispensing means for conveying the dispensed gas to a locus of use, etc.

In one embodiment, the vessel is equipped with a valve head assembly including a regulator and a flow control valve, arranged so that gas dispensed from the vessel is flowed through the gas regulator prior to the gas flow control valve. In such configuration, the regulator may be disposed in the interior volume of the vessel, in a neck portion or at a port of the vessel, or in the valve head itself. As a still further alternative, the flow control valve of the valve head may be arranged upstream of a regulator element, in a conventional gas dispensing arrangement.

While the invention is discussed primarily hereinafter in terms of the storage and delivery of boron trifluoride, silane, arsine and phosphine gases, it will be recognized that the utility of the present invention is not thus limited, but rather extends to and is inclusive of various other hydride and halide gases, as for example diborane, arsine, phosphine, chlorine, $BCl_3$, $B_2D_6$, tungsten hexafluoride, hydrogen fluoride, hydrogen chloride, hydrogen iodide, hydrogen bromide, gennane, ammonia, stibine, hydrogen sulfide, hydrogen selenide, hydrogen telluride, and corresponding and other halide (chlorine, bromine, iodine, and fluorine) gaseous compounds such as $NF_3$, and organometallic compounds, e.g., Group V compounds such as $(CH_3)_3Sb$.

The present invention thus enables adsorption of gases into a physical adsorbent to substantially reduce the vapor pressure of the gas. The sorbent-based gas storage and dispensing system of the invention can be readily fabricated by steps including charging of the sorbent into the interior volume of the vessel followed by charging of the working gas into the vessel for adsorption on the sorbent, with any unadsorbed portion of the gas residing in the void spaces and head space of the interior volume in the vessel, followed by sealing of the vessel so that it is closed to the ambient environment. Although primarily disclosed hereinafter in reference to activated carbon and zeolites, the invention is broadly applicable to the usage of a wide variety of other physical sorbent materials, such as kieselguhr, silica, alumina, macroreticulate polymers (e.g., Amberlite resins, available from Rohm & Haas Company, Philadelphia, Pa.), etc.

Zeolites are one class of suitable sorbents, and are microporous crystalline aluminosilicates of alkali or alkaline earth elements represented by following stoichiometry:

where x and y are integers with y/x=to or greater than 1, n is the valence of the cation M and z is the number of water molecules in each unit cell. Zeolite 5A has $\sim 2.5 \times 10^{21}$ hydride adsorption sites per gram.

In the preferred practice of the invention, the solid-phase physical sorbent medium is devoid of trace components selected from the group consisting of water, metals, and oxidic transition metal species in a concentration which is insufficient to decompose the sorbate gas in said storage and dispensing vessel. A highly advantageous sorbent medium of such type is commercially available from Zeochem Company (Louisville, Ky.) as Zeochem Binderless 5A sorbent, which is a synthetic calcium aluminosilicate of the formula $(CaO.Na_2O).Al_2O_3.2SiO_2.xH_2O$.

In this respect, it is to be noted that the significant presence in the sorbent material of any water, metals, or transition metal oxides tends to promote undesirably high levels of decomposition of the sorbate gas. In molecular sieves and other materials which lack such "contaminants," the sorbate gas degradation levels, and corresponding pressure levels are maintained at correspondingly low values. Concerning molecular sieve materials most specifically, a large number of such sorbents invariably contain clay or other mineralic binders that contain the aforementioned decomposition promotors, which otherwise undesirably degrade the performance of the storage and delivery system apparatus and method.

By way of example, the above-mentioned binderless Zeochem material has no detectable metallic impurities, while other conventional molecular sieve materials, e.g., Linde 5A zeolite has a substantial amount of iron therein. In consequence, the binderless zeolite exhibits decomposition levels which are on the order of about 1–2% of arsine (in an arsine storage and delivery system apparatus containing such zeolite) per year, while the Linde 5A zeolite exhibits decomposition levels of arsine which are on the order of a few tenths of a percent of the arsine per day. With the binderless zeolite, pressure increases in the sorbent material-containing vessel are less than 5% per week, while the Linde 5A zeolite (containing binder metal components) exhibits pressure rises of 9 psig (60%) per day in a corresponding storage and delivery system apparatus.

The solid-phase physical sorbent medium in the preferred practice of the invention therefore contains less than 350 parts-per-million by weight of trace components selected from the group consisting of water and oxidic transition metal species, based on the weight of the physical sorbent medium, more preferably less than 100 parts-per-million by weight, still more preferably less than 10 parts-per-million, and most preferably no more than 1 part-per-million by weight of trace components selected from the group consisting of water and oxidic transition metal species, based on the weight of the physical sorbent medium.

Correspondingly, the solid-phase physical sorbent medium concentration of trace components selected from the group consisting of water and oxidic transition metal species (e.g., oxides, sulfites and nitrates), based on the weight of the physical sorbent medium, preferably is insufficient to decompose more than 5% by weight of the sorbate gas after 1 year at 25° C. and said interior pressure.

It is a significant discovery that the decomposition of hydridic gases such as arsine, phosphine, etc., can be suppressed by the provision of sorbent materials which are devoid of more than trace amounts of contaminants such as iron, which are conventionally present in commercially available molecular sieves and other sorbent materials comprising mineralic or clay-based binders, which have been incorporated in the sorbent composition for enhancing the structural stability and integrity of the sorbent material.

For high purity gas dispensing operation from the sorbent-based storage and dispensing system of the invention, it is desirable that the supply vessel be subjected to suitable preparative operations, such as vessel bake-out, and/or purging, to ensure that the vessel itself is free of contaminants that may outgas or otherwise adversely affect the gas dispensing operation in subsequent use of the sorbent-based storage and dispensing system. Further, the sorbent itself may be subjected to appropriate preparative operations, such as pretreatment to ensure desorption of all extraneous species from the adsorbent material, prior to being loaded in the supply vessel, or alternatively of being subjected to bake-out and/or purging after the adsorbent is charged to the vessel.

The present invention has utility in the manufacture of semiconductor materials and devices, and in other gas-consuming process operations, where it provides a reliable "on demand" source of gas, e.g., hydride gases, halide gases, and gaseous organometallic Group V compounds, including, for example, silane, diborane, germane, ammonia, phosphine, arsine, stibine, hydrogen sulfide, hydrogen selenide, hydrogen telluride, boron trifluoride, tungsten hexafluoride, chlorine, hydrogen chloride, hydrogen bromide, hydrogen iodide, and hydrogen fluoride.

By providing an economical and reliable source of such gases, in which the gas is safely held at relatively lower pressure in the adsorbed state on a sorbent medium, and subsequently is easily dispensed to the point of use of the gas, the present invention avoids the hazards and gas handling problems associated with the use of conventional high pressure gas cylinders.

One preferred carbon sorbent material in the practice of the invention is a Kureha BAC-G-70R carbon material, commercially available from Kureha Corporation of America, New York, N.Y., having the physical properties set out in Table I below.

TABLE I

| Bead Carbon Sorbent Material | |
|---|---|
| True Density | 1.9–2.1 g/ml |
| Bulk Density | 0.5–0.62 g/ml |
| Surface Area | 800–1300 m$^2$/grams |
| CC14 Activity | ≧55% |
| Kindling Point | 400° C. |
| Auto-ignition Point (in air) | 400° C. |
| Ash Content | ≦0.5% |
| Particle Size Availability | 0.4–0.7 mm |
| Particle Size of BAC-G-70R | 0.7 mm Avg.; >0.84 mm (25%); <0.59 mm (5%) |
| Moisture Content | <5% |

The moisture content of this bead carbon material is advantageously further reduced by heating and evacuation of the carbon as originally supplied from the vendor, to levels as low as 0.01% and below. Such pretreatment of the carbon sorbent is also of benefit in respect of other undesirable adsorbed impurities in the as-received carbon material.

In general, it is desirable to utilize a sorbent material having a substantial portion, preferably at least 50%, of its pores in the size range of from about 10 to 1000 Angstroms. More desirably, the sorbent material has a major fraction, i.e. more than 50%, of its pore volume, comprised of pores with a diameter in the range of from about 2 Angstroms to 100 Angstroms, with preferably more than 80%, and most preferably substantially all of the pore volume of the sorbent material, being in such range.

Preferred sorbent materials include sorbents having an average pore diameter in the range of from about 10 to about 20 Angstroms, and a major fraction of the pore volume within such range, with preferably more than 80%, and most preferably substantially all of its pore volume being in such range.

Desirable sorbents include materials having a pore volume (cumulative void volume) in the range of from about 0.2 to about 2.0 cubic centimeters of pore volume per gram of sorbent material.

The sorbent material desirably has the characteristic of readily sorbing the sorbate fluid in the first instance, at suitably high rate, and correspondingly releasing the previously sorbed fluid in a rapid manner in response to (1) a pressure differential between the interior volume of the storage and dispensing vessel and an exterior locus at lower pressure, and/or (2) heating of the sorbent and/or other desorption modality or modalities, when the storage and dispensing system is in a fluid dispensing mode of operation.

Preferred sorbent materials useful in the fluid storage and dispensing system of the invention include materials having a pore volume (cumulative void volume) in the range of from about 0.1 to about 5.0 cubic centimeters of pore volume per gram of sorbent material, and preferably from about 0.5 to about 2.0 cubic centimeters of pore volume per gram of sorbent material.

Highly preferred materials include sorbents having an average pore diameter in the range of from about 2 to about 20 Angstroms, and a major fraction of the pore volume within such range, more preferably more than 80%, and most preferably substantially all of its pore volume being in such range.

Bead activated carbon materials, having a highly uniform spherical shape, with a particle size in the range of from about 0.1 millimeter to 1 centimeter diameter, and more preferably from about 0.25 to about 2 millimeters diameter, are highly advantageous in the practice of the present invention. It will be recognized that the sorbent particle size, shape, and pore size distribution may be independently and significantly varied in the practice of the invention, to adjust the packing of the sorbent particles and the loading density of the sorbent material in the bed.

The sorbent materials useful in the fluid storage and dispensing system of the invention generally may have any suitable size, shape, and conformation, including beads, granules, pellets, tablets, powders, particulates, extrudates, cloth or web form materials, honeycomb matrix monolith, and composites (of the sorbent with other components), as well as comminuted or crushed forms of the foregoing conformations of sorbent materials. Preferred forms include finely divided particulate forms such as beads, granules and pellets.

The sorbent material may comprise any suitable material, including polymers (e.g., microporous TEFLON, macroreticulate polymers, glassy domain polymers, etc.), aluminum phosphite, clays, zeolites, porous silicon, honeycomb matrix materials, carbon materials, etc.

Most preferred sorbent materials include zeolite sorbent materials and carbon sorbents. Among the preferred carbon sorbent materials, bead activated carbon materials, having a highly uniform spherical shape, with a particle size in the range of from about 0.1 millimeter to 1 centimeter diameter, and more desirably from about 0.25 to about 2 millimeters diameter, are most highly preferred.

Figure 2:
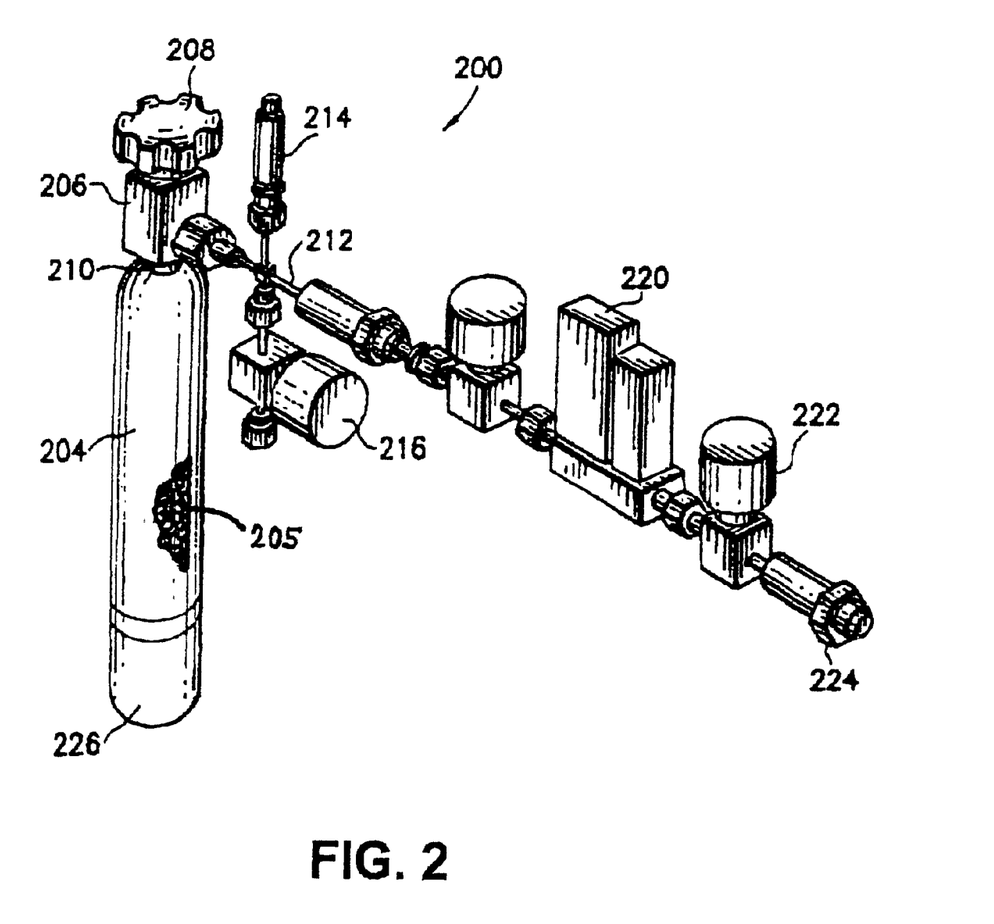
FIG. 2 is a perspective schematic view of a gas storage and dispensing system 200 according to one embodiment of the invention.

FIG. 2 is a perspective schematic view of a gas storage and dispensing system 200 according to one embodiment of the invention.

As shown, the storage and dispensing system 200 comprises a storage and dispensing vessel 204 holding a bed of physical adsorbent 205. The gas storage and dispensing vessel has a base portion 226 and is joined at its upper portion to a valve head 206 comprising part of a dispensing assembly including manual actuator 208 for the valve head on the cylinder. The valve head is joined by means of coupling 210 to a dispensing conduit 212 having disposed therein a pressure transducer 214, an inert purge unit 216 for purging the dispensing assembly with inert gas, a mass flow controller 220 for maintaining constant flow rate through the dispensing conduit 212 during the dispensing operation, and a filter 222 for removing particulates from the dispensed gas prior to its discharge from the dispensing assembly.

The dispensing assembly further comprises a coupling 224, for matably engaging the dispensing assembly with downstream piping, valving, or other structure associated with the locus of use of the dispensed gas.

The physical adsorbent in the FIG. 2 system may by way of specific example be an activated carbon sorbent holding boron trifluoride as the working gas, where the boron trifluoride is adsorbed on the activated carbon adsorbent in sorbent bed 205, and is present as free (unadsorbed) gas in the sorbent bed interstices and the head space of the vessel.

Figure 3:
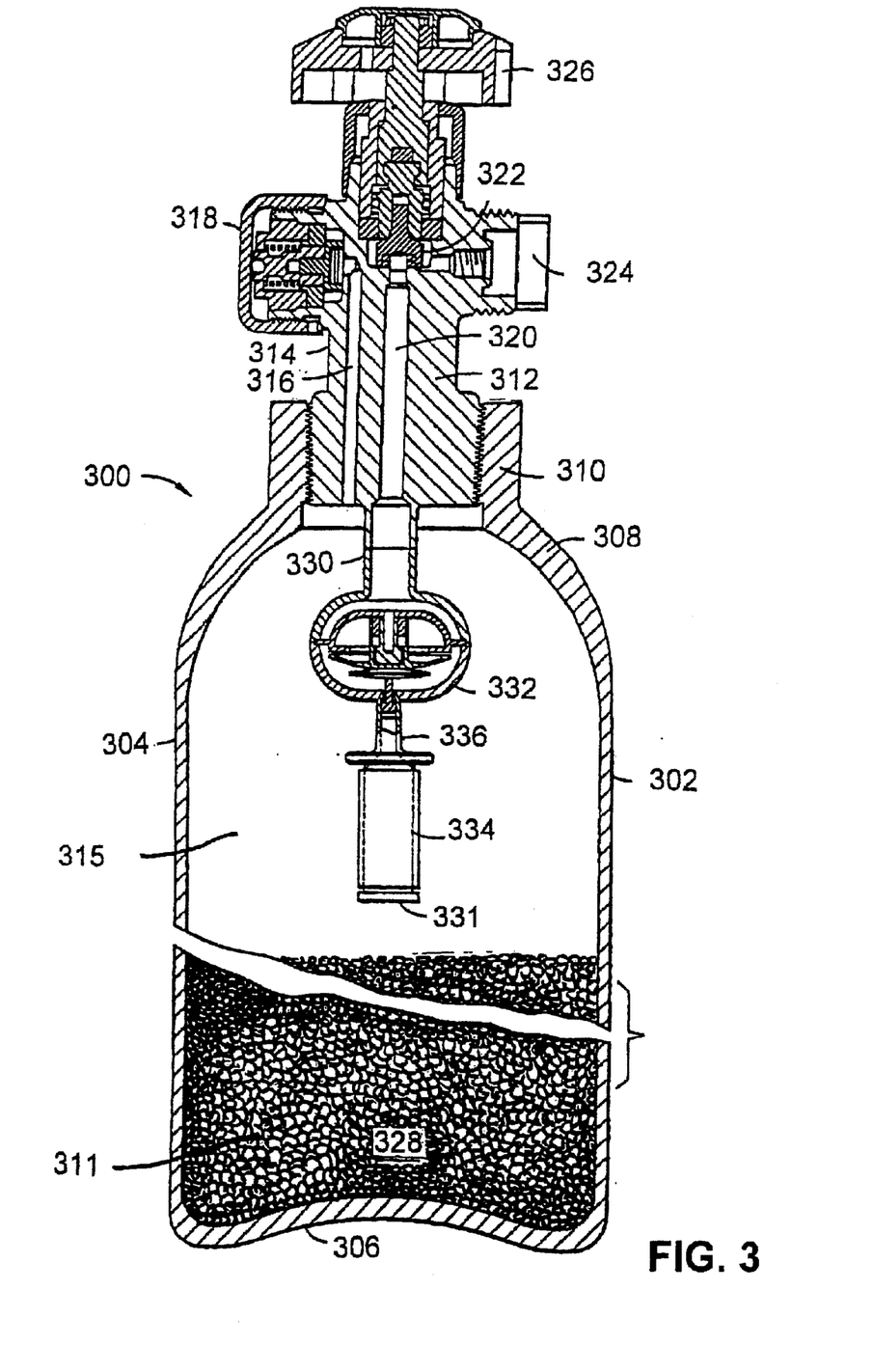
FIG. 3 is an elevation view, in cross-section, of a regulator-equipped gas storage and dispensing vessel, according to a further embodiment of the invention.

FIG. 3 is a schematic cross-sectional elevation view of one gas storage and dispensing system 300 according to another illustrative embodiment of the invention. The system 300 includes a gas storage and dispensing vessel 302 of generally cylindrical form, with a cylindrical sidewall 304 closed at its lower end by floor member 306. At the upper end of the vessel is a neck 308 including a cylindrical collar 310 defining and circumscribing a top opening (port) of the vessel. The vessel wall, floor member and neck thereby enclose an interior volume 328, as shown, in which an adsorbent bed 311 is disposed. The physical adsorbent in the adsorbent bed is selected to have a suitably high sorptive affinity and capacity for the working gas, so that the working gas is sorptively held by the adsorbent, as well as subsisting in free form in the interstices and head space 315 of the vessel.

At the neck of the vessel, a threaded plug 312 of the valve head assembly 314 is threadably engaged with the interior threaded opening of the collar 310. The valve head assembly 314 includes a central fluid flow passage 320 joined in fluid flow communication with a central working volume cavity in the valve head assembly. The central working volume cavity in turn is joined to outlet 324, which may be exteriorly threaded or otherwise constructed for attachment of a connector and associated piping, conduit, etc. thereto.

Disposed in the central working volume cavity is a valve element 322 that is joined to a hand wheel 326 in the embodiment shown, but may alternatively be joined to an automatic valve actuator or other controller or actuating means.

The valve head assembly 314 also features in the valve block a fill passage 316 communicating with fill port 318 and the interior volume 328 of the vessel. The vessel 302 may thereby be charged with pressurized gas, following which the fill port is closed and capped, as shown.

The central fluid flow passage 320 in the valve head assembly 314 is joined at its lower end to a connector flow tube 330, to which in turn is joined to the regulator 332. The regulator is set to maintain a selected pressure of the fluid discharged from the vessel.

At the lower end of the regulator is joined a tubular fitting 336 which in turn is joined, e.g., by butt welding, to a filter unit 334 having a diffuser end cap 331 at its lower extremity. The filter unit may be formed of stainless steel, with the diffuser wall being formed of a sintered stainless steel such as 316L stainless steel. The filter unit has a wall porosity that permits removal of all particles greater than a predetermined diameter, e.g., greater than 0.003 micrometers at 30 standard liters per minute flow rate of gas from the system. Filter units of such type are commercially available from Mott Corporation (Farmington, Conn.).

In use, a pressurized gas is contained in the interior volume 328 of the vessel 302, sorptively held by the sorbent in the adsorbent bed 311, and in free form in the void spaces and the head space 315 of the vessel. The gas pressure regulator 332 is set to a selected set point to provide flow of dispensed gas when the valve in the valve head assembly 314 is opened, with the gas flowing through the filter unit 334, fitting 336, regulator 332, connector flow tube 330, central fluid flow passage 320 in the valve head assembly 314, the central working volume cavity, and outlet 324. The valve head assembly may be joined to other piping, conduits, flow controllers, monitoring means, etc. as may be desirable or required in a given end use application of the invention.

The gas storage and dispensing vessel 302 in the FIG. 3 embodiment may by way of example contain silane gas that is sorptively retained in the vessel by a molecular sieve or a carbon adsorbent at a pressure of e.g., 50–100 psig.

The gas storage and dispensing system shown in FIG. 3 may be arranged for superatmospheric pressure dispensing with a fixed flow rate by use of a restrictive flow orifice in the gas dispensing flow path that matches the process requirements for the dispensed gas. The regulator is normally closed and flow only occurs when the delivery manifold (flow circuitry downstream from the gas storage and dispensing vessel) matches the threshold operating pressure.

Such set point regulator arrangement eliminates the potential for accidental backfilling of purge gas into the vessel while the vessel is coupled into a gas flow circuit. The set pressure regulator employs a pressure sensing apparatus [PSA] to regulate flow. A welded bellows diaphragm, reacting to the downstream delivery pressure, adjusts the position of a tapered poppet in the gas flow path. The PSA unit is calibrated and sealed during manufacture of the regulator assembly.

The gas storage and dispensing vessel in FIG. 3 utilizes a single stage internal regulator, arranged so that the dispensed gas flows through the regulator before it enters the valve head and flows through the valve therein. The FIG. 3 arrangement may be employed in conjunction with a regulator in a gas cabinet containing the gas storage and dispensing vessel, to thereby provide dual stage regulator performance and individualized pressure control at the vessel as well as exteriorly thereof.

It will be appreciated that the structure of the FIG. 3 gas storage and dispensing system may be modified, with positioning of the regulator in the valve head or in the neck of the vessel, upstream of the flow control valve, or a vessel arrangement may be employed in which a regulator is downstream of the flow control valve for the vessel. Nonetheless, it is preferred in practice to deploy the regulator at least partially within the interior volume of the vessel, to thereby protect the regulator from shock, impact and vibration during storage, transport and use of the vessel, as well as to realize the performance and safety benefits of positioning the regulator upstream of the flow control valve.

To simulate long term operation of gas storage and dispensing systems of the type shown in FIG. 3, four regulators of the type shown in FIG. 3 and described hereinabove were simultaneously tested over a course of 750,000 operating cycles in $BF_3$ and another set of four regulators were cycled over 350,000 times in silane. Each cycle involved gas flow for 10 minutes and required that the regulator subsequently close and seal. The average variation in regulator control was 6% and no significant issues were observed. The leak rate across the regulators was below $7 \times 10^{-6}$ atm-cc/hr.

The interior positioning of the regulator in the FIG. 3 system avoids any release problems incident to any possible failure of the regulator, e.g., due to a diaphragm weld failure in the PSA. Such a failure would result in the loss of the calibration gas. Without the compensating force in the PSA, the regulator will fail in a "closed" state and result in a flow loss, so that the failure of the component is contained within the cylinder vessel, and occasions no loss or leakage of the gas from the vessel.

The features and advantages of the present invention are more fully shown by the following non-limiting examples.

EXAMPLE 1

Using Fault Tree methodology, "pre-regulated" cylinders of the type shown in FIG. 3 were compared with standard high pressure cylinders in silane service. Gas cabinet installations were identical and corresponding fault trees were constructed and risk analysis completed. The potential release scenarios [Si] numbered over 20 for each comparison and many involved multiple failures for a release to occur. In this manner an overall frequency of occurrence was determined, risks calculated and the delivery methods compared on a relative basis.

The likelihood of incidents is effected by cylinder replacement frequency and delivery pressure. The consequence of operational incidents or worst case release rate [WCR]—is shown in Table 2 and ranges from 30.5 to 70.8 slpm (NFPA 318 Standard for the Protection of Cleanrooms, 2000 Edition). The WCR for a pre-regulated cylinder of the type shown in FIG. 3 was capped at 8.2 slpm and for all fill pressures.

TABLE 2

Silane Flow Rates as Through a 0.010" Restricted Flow Orifice as a Function Of Cylinder Pressure

| Pressure [psig] | WCR Flow [slpm] | Mass [kg] |
|---|---|---|
| 1600 | 70.8 | 15 |
| 1200 | 55.7 | 12 |
| 800 | 30.5 | 5 |

EXAMPLE 2

Silane Delivery—Comparative Example

Pre-regulating pressure was set to fix a constant delivery pressure which was independent of fill pressure. Silane fill densities are a function of risk tolerance; about half of the fills in this test were 5 kg fills, with the remainder of the fills spread between 10 kg, 12 kg and 15 kg charges of fluid to the vessel. Table 3 below sets out the silane worst case release rates at 800 psig and 100 psig, wherein VAC as used hereinafter refers to a gas storage and dispensing system of the type shown and described with reference to FIG. 3 hereof.

TABLE 3

Silane Worst Case Release Rates at 800 psig and 100 psig

| Cylinder | Pressure | Capacity | RFO | Release Rate |
|---|---|---|---|---|
| Standard | 800 psig | 5 kg | 0.010" | 30.5 slpm |
| VAC | 100 psig | 15 kg | 0.010 | 3.5 slpm |
| [1600 psig] | 100 psig | 15 kg | 0.014 | 6.9 slpm |

Table 4 below sets out the results of relative risk analysis for silane delivery options.

TABLE 4

| Gas Delivery System | Frequency | Consequence | Risk | Risk Ratio |
|---|---|---|---|---|
| 15 kg, VAC (100 psig) | 4.44E-3 | 8.2 | 3.64E-2 | 1 |
| 5 kg, 800 psig | 1.49E-2 | 30.5 | 4.54E-1 | 12.5 |
| 10 kg, 1200 psig | 1.27E-2 | 55.0 | 6.98E-1 | 19.2 |
| 15 kg, 1550 psig | 1.16E-2 | 70.8 | 8.21E-1 | 22.6 |

On a relative risk basis, the VAC delivery system [100 psig] of the type shown in FIG. 3 is predicted to be 12 to 23 times safer than a standard silane cylinder equipped with an 0.010" restrictive flow orifice (RFO). The lower release rate [consequence] term for a given incident, a function of delivery pressure, provides this result.

EXAMPLE 3

Economics of Higher Fill Densities

Safer packaging enables higher productivity. Minimizing risk is a primary underlying reason for raising fill densities and increasing productivity using gas packaging of the type shown in FIG. 3. Using silane as an example, tripling the deliverable quantity reduces costs by about 15–20%, in addition to lowering risk. An estimate for a semiconductor manufacturing facility ("fab") using over 2000+ kg $SiH_3$/year is provided in Table 5 below. No safety benefit is included.

TABLE 5

High Fill Densities Productivity Gains

| Category | Savings [%] |
|---|---|
| Labor/Logistics | 8–12 |
| Heels/Cylinder Utilization | 4–7 |
| Exhaust Reduction | 1–2 |
| Quals | 1–2 |
| System Maintenance | 1–2 |

Exhaust rates for silane cabinets are set to limit the maximum concentration inside the enclosure to 0.34% by volume based on the release rate defined by cylinder pressure and the RFO in the discharge line [WCR] (see CGA P-32-2000. Safe Storage and Handling of Silane and Silane Mixtures [First Edition]). Pre-regulating pressure, using gas packaging of the type shown in FIG. 3 hereof, reduces the consequence of a release by 4–10 fold allowing ventilation practices to be re-examined and adjusted accordingly, to minimize capital equipment and operating costs associated with the ventilation requirements of the semiconductor manufacturing process.

EXAMPLE 4

Gas storage and delivery in accordance with the present invention affords a fundamentally greater level of risk reduction than any mechanical attempts to achieve equivalent operating pressures. The present invention permits substantial reduction of cylinder pressure over the corresponding use of gas cylinders of the prior art. The use of sorbents in gas cylinders, in accordance with the present invention, reduces the pressure by 50–90% and increases deliverables 2–4 fold. The result of using sorbents for gas storage and dispensing vessel pressures with several common gas materials (boron trifluoride, arsine and phosphine) is shown in Table 6 below, in which "Std. HP" denotes a standard high pressure gas cylinder and "GasSorb" denotes the use of a sorbent-based storage and dispensing cylinder in accordance with the present invention.

TABLE 6

| 2.2 L Cylinder | Pressure | Capacity | Deliverable* | Pressure change |
|---|---|---|---|---|
| Std. HP $BF_3$ | 400 psig | 180 g | 180 g | — |
| $BF_3$ GasSorb | 100 psig | 598 g | 524 g | −75% |
| $BF_3$ GasSorb | 200 psig | 728 g | 654 g | −50% |
| Std. HP $AsH_3$ | 210 psig | 454 g | 454 g | — |
| $AsH_3$ GasSorb | 20 psig | 832 g | 689 g | −90% |
| $AsH_3$ GasSorb | 50 psig | 962 g | 819 g | −76% |
| Std. HP $PH_3$ | 510 psig | 454 g | 454 g | — |
| $PH_3$ GasSorb | 50 psig | 364 g | 332 g | −90% |
| $PH_3$ GasSorb | 100 psig | 416 g | 384 g | −80% |
| PH3 GasSorb | 200 psig | 442 g | 410 g | −60% |

The present invention exploits the affinity of gases to be aggregated within a microporous physical adsorbent to achieve substantial pressure reduction and gas storage capacity increases. The invention thereby affords an approach for reducing cylinder pressures, and, correspondingly, the consequences of a release. With the gas storage and dispensing system of the present invention, restricted flow orifices are readily used to match the discharge rate to the end use process requirements.

The approach of the present invention substantially reduces gas delivery pressures and lowers risk on a relative basis 10 to 1000 fold. Larger fill densities reduce cylinder changeouts and increase productivity. Integrating lower pressure operation with appropriate gas cabinet controls adds additional safety.

EXAMPLE 5

For non-liquified high pressure gases such as $BF_3$ and $SiH_4$, as typically supplied in high pressure gas cylinders, the gas storage capacity is usually determined and limited by the cylinder pressures. To increase the storage capacity without further increase in the cylinder pressure, adsorption technology in accordance with the present invention is employed. This example compares the storage capacity of gas storage and dispensing vessels for boron trifluoride and silane in a conventional high pressure gas cylinder and in a corresponding cylinder filled with a sorbent having sorptive affinity for the contained gas.

Table 7 below compares the storage capacity of $BF_3$ and silane in an adsorbent-filled cylinder and in a conventional cylinder at room temperature (20° C.). The adsorption capacity of $BF_3$ was determined using a computer model which typically produced a prediction error of ±20%. The capacity for silane was determined experimentally. For this calculation, the cylinder size was taken as 2.2 liters, which is equivalent to the volume of a JY series cylinder.

TABLE 7

| | Adsorbent filled cylinder | | | High pressure cylinder | | |
|---|---|---|---|---|---|---|
| Pressure (psig) | adsorbed BF3 (g) | Free BF3 (g) | Total (g) | adsorbed BF3 (g) | Free BF3 (g) | Total (g) |
| 0 | 220 | 3 | 223 | 0 | 6 | 6 |
| 100 | 569 | 24 | 593 | 0 | 48 | 48 |
| 500 | 836 | 109 | 945 | 0 | 218 | 218 |
| 800 | 889 | 173 | 1062 | 0 | 346 | 346 |
| 1000 | 906 | 215 | 1121 | 0 | 430 | 430 |
| 1500 | 925 | 321 | 1246 | 0 | 642 | 642 |

The silane capacity at 30 psig and 22° C. was as follows:

In an adsorbent-filled cylinder: 210 grams

In a standard high-pressure cylinder: 8.8 grams

The foregoing results show that the sorbent-based gas storage and dispensing systems of the invention are effective to provide a surprising level of improvement in gas capacity of the storage and dispensing vessel, relative to a sorbent-free vessel, at corresponding pressure levels. Alternatively, the invention permits the same capacity to be achieved at very substantially lower pressures in the gas containment vessel, or as a still further alternative, the capacity can be increased as well as reducing the pressure, by appropriate choice of pressure and sorbent material for a specific working gas, to enhance the safety and operating life of the gas storage and dispensing vessel, in relation to the high pressure gas cylinder vessels of the prior art.

What is claimed is:

1. A method of increasing capacity of a high pressure gas cylinder for containing gas at a predetermined pressure level and/or decreasing the pressure of gas in said cylinder while maintaining at least as large an inventory of gas therein and reducing risk of release of gas to an ambient environment of the cylinder, said method comprising disposing in the interior volume of said cylinder a physical adsorbent having sufficient sorptive affinity and capacity for said gas, so that the cylinder containing said physical adsorbent holds more gas at a corresponding pressure or has a gas pressure below said predetermined pressure level at a same gas inventory amount, and providing said cylinder with gas dispensing means comprising at least one of (i) a gas regulator disposed in the interior volume of the cylinder, and (ii) a restrictive flow orifice arranged to restrict flow of gas dispensed from the cylinder.

2. A gas storage and dispensing system having a low risk of release of gas to an ambient environment of the vessel, said system including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel, said gas dispensing means comprising at least one of (i) a gas regulator disposed in the enclosed interior volume of the gas storage and dispensing vessel, and (ii) a restrictive flow orifice arranged to restrict flow of gas dispensed from the gas storage and dispensing vessel.

3. The gas storage and dispensing system of claim 2, wherein the superatmospheric pressure is above 10 psig.

4. The gas storage and dispensing system of claim 2, wherein the superatmospheric pressure is above 50 psig.

5. The gas storage and dispensing system of claim 2, wherein the superatmospheric pressure is in a range of from about 10 psig to about 1500 psig.

6. The gas storage and dispensing system of claim 2, wherein the superatmospheric pressure is in a range of from about 20 psig to about 1000 psig.

7. The gas storage and dispensing system of claim 2, wherein the superatmospheric pressure is in a range of from about 50 psig to about 500 psig.

8. The gas storage and dispensing system of claim 2, wherein the superatmospheric pressure is in a range of from about 50 psig to about 200 psig.

9. The gas storage and dispensing system of claim 2, wherein the superatmospheric pressure is in a range of from about 50 psig to about 100 psig.

10. The gas storage and dispensing system of claim 2, wherein the superatmospheric pressure is lower than pressure of a same gas in a corresponding sorbent-free vessel having a same gas delivery capacity.

11. The gas storage and delivery system of claim 2, wherein the amount of gas in the interior volume of the vessel is greater than the amount in a corresponding sorbent-free vessel at a same gas pressure.

12. The gas storage and dispensing system of claim 2, wherein the gas pressure is lower than pressure in said corresponding sorbent-free vessel and the amount of gas in said vessel is greater than the amount of a same gas in a corresponding sorbent-free vessel.

13. The gas storage and dispensing system of claim 2, wherein the gas comprises a hydride gas.

14. The gas storage and dispensing system of claim 2, wherein the gas comprises a gas species selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, hydrogen iodide, hydrogen bromide, germane, ammonia, stibine, hydrogen sulfide, hydrogen selenide, hydrogen telluride, and $NF_3$.

15. The gas storage and dispensing system of claim 2, wherein the gas comprises boron trifluoride.

16. The gas storage and dispensing system of claim 2, wherein the gas comprises silane.

17. The gas storage and dispensing system of claim 2, wherein the gas comprises arsine.

18. The gas storage and dispensing system of claim 2, wherein the gas comprises phosphine.

19. The gas storage and dispensing system of claim 2, wherein the physical adsorbent is selected from the group consisted of carbon, silica, molecular sieves, alumina, macroreticulate polymers, kieselguhr and aluminosilicates.

20. The gas storage and dispensing system of claim 2, wherein the physical adsorbent comprises carbon.

21. The gas storage and dispensing system of claim 2, wherein the physical adsorbent comprises a zeolite adsorbent.

22. A gas storage and delivery system, including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel, wherein the physical adsorbent contains less than 350 parts per million by weight of trace components selected from the group consisting of water and oxidic transition metal species, based on the weight of the physical adsorbent.

23. A gas storage and delivery system, including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel, wherein the physical adsorbent contains less than 100 parts per million by weight of trace components selected from the group consisting of water and oxidic transition metal species, based on the weight of the physical adsorbent.

24. A gas storage and delivery system, including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel, wherein the physical adsorbent contains no more than 1 part per million by weight of trace components selected from the group consisting of water and oxidic transition metal species, based on the weight of the physical adsorbent.

25. A gas storage and delivery system, including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel, wherein the physical adsorbent is devoid of trace components selected from the group consisting of waters, metals, and oxidic transition metal species in a concentration sufficient to decompose the gas in said storage and dispensing vessel.

26. A gas storage and delivery system, including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel, wherein the physical adsorbent concentration of trace components selected from the group consisting of water and oxidic transition metal species, based on the weight of the physical adsorbent, is insufficient to decompose more than 5% by weight of the gas after one year at 25° C. and gas pressure in said interior volume.

27. The gas storage and dispensing system of claim 26, wherein the oxidic transition metal species are selected from the group consisting of oxides, sulfites and nitrates.

28. A gas storage and dispensing system having a low risk of release of gas to an ambient environment of the vessel, said system including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is lower than gas pressure of a same gas in a corresponding sorbent-free vessel and/or the amount of gas in said interior volume of the vessel is higher than the amount of the same gas in a corresponding sorbent-free vessel, wherein a gas flow regulator is associated with the vessel and a gas flow controller, such that gas dispensed from the vessel in dispensing operation thereof flows through said gas flow regulator prior to flow through said gas flow controller.

29. The gas storage and dispensing system of claim 28, wherein the gas flow controller comprises a gas flow control valve.

30. The gas storage and dispensing system of claim 28, wherein the gas flow regulator is at least partially disposed in the interior volume of the vessel.

31. The gas storage and dispensing system of claim 28, wherein the gas flow regulator is wholly disposed in the interior volume of the vessel.

32. The gas storage and dispensing system of claim 28, wherein the gas flow regulator is disposed in a valve head assembly coupled to said vessel.

33. A gas storage and dispensing system having a low risk of release of gas to an ambient environment of the vessel, said system including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure, and wherein said gas pressure is from 50% to 90% lower than gas pressure of a same gas in a corresponding sorbent-free vessel and the amount of gas in said interior volume of the vessel is 2–4 fold higher than the amount of the same gas in a corresponding sorbent-free vessel; and said pressure of gas in the gas storage and dispensing vessel, said amount of gas in the gas storage and dispensing vessel, and said gas dispensing means are selected and arranged to provide a worst-case release rate of gas from the gas storage and dispensing vessel below 8.2 standard liters per minute (slpm).

34. A gas storage and dispensing system having a low risk of release of gas to an ambient environment of the vessel, said system including a gas storage and dispensing vessel having an enclosed interior volume joined to gas dispensing means, wherein said interior volume contains a physical adsorbent and a gas in the interior volume and at least partially adsorbed on the physical adsorbent, wherein the gas pressure in said interior volume is at superatmospheric pressure of from about 10 psig to about 1500 psig and said gas pressure is lower than gas pressure of a same gas in a corresponding sorbent-free vessel and/or the amount of gas in said interior volume of the vessel is higher than the amount of the same gas in a corresponding sorbent-free vessel;

said physical adsorbent comprises sorbent material selected from the group consisting of:
(a) binderless molecular sieve having less than 1 ppm of trace components selected from the group consisting of water and oxidic transition metal species; and
(b) bead activated carbon having a pore volume in a range of from about 0.2 to about 2.0 cubic centimeters of pore volume per gram of sorbent material, at least 50% of pores thereof in a range of from about 2 to about 100 Angstroms, and a particle size in a range of from about 0.1 millimeter to about 1 centimeter diameter;

said gas dispensing means are arranged in relation to the gas pressure in the interior volume of the vessel and the amount of gas in the interior volume of the vessel to provide a worst case release rate of gas from the vessel below 8.2 standard liters per minute (slpm).

35. The gas storage and dispensing system of claim 34, wherein said sorbent material comprises bead activated carbon particles having a diameter not exceeding about 2 millimeters, and said gas dispensing means comprise a dispensed gas filter in the interior volume of the vessel, arranged for removing particles greater than 0.003 micrometers at gas flow rate of 30 standard liters per minute (slpm) of gas dispensed from the vessel.

36. The gas storage and dispensing system of claim 34, wherein said gas dispensing means comprise a regulator having a leak rate below $7 \times 10^{-6}$ atm-cc/hr.

* * * * *